Dec. 24, 1935.  D. C. PRINCE  2,025,548
PROTECTIVE MEANS FOR MERCURY ARC DEVICES
Filed Aug. 12, 1930

Inventor:
David C. Prince,
by Charles E. Tullar
His Attorney

Patented Dec. 24, 1935

2,025,548

UNITED STATES PATENT OFFICE 2,025,548

PROTECTIVE MEANS FOR MERCURY ARC DEVICES

David C. Prince, Schenectady, N. Y., assignor to General Electric Company, a corporation of New York Application August 12, 1930, Serial No. 474,841

4 Claims. (Cl. 175—363)

My invention relates to electric systems wherein power is transmitted between direct and alternating current circuits by means of vapor electric devices such as mercury arc rectifiers and has for its principal object the provision of improved apparatus whereby the systems are protected against electrical disturbance and damage caused by arc back in the vapor electric devices.

Difficulties have been encountered heretofore in the operation of vapor electric devices of the mercury arc rectifier type due to the occurrence of arc-back between negatively and positively charged anodes, or between other parts of these devices. The causes of arc-back have been obscure and no entirely satisfactory means have been provided heretofore for limiting to a negligible amount, or for preventing entirely, the damage thereby occasioned to transformer windings and other rectifier apparatus. In accordance with my invention this difficulty is avoided by the provision of means responsive to the reverse current accompanying arc back for impressing a potential of such value on control electrodes associated with the anodes of the rectifier that, on occurrence of arc back, the flow of current therein is prevented.

My invention will be better understood from the following description when considered in connection with the accompanying drawing and its scope will be pointed out in the appended claims.

Figure 1:
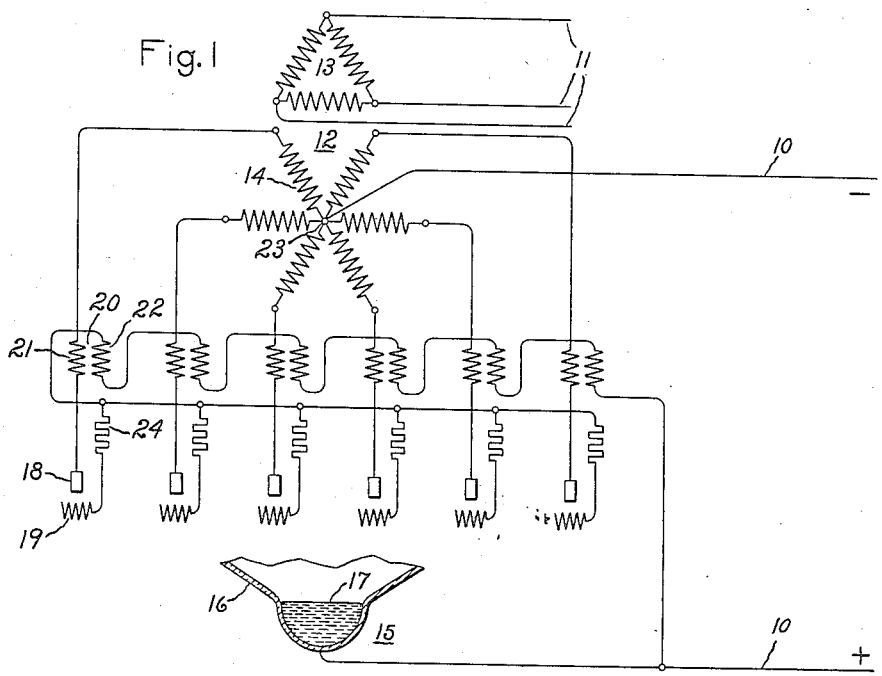
Figure 2:
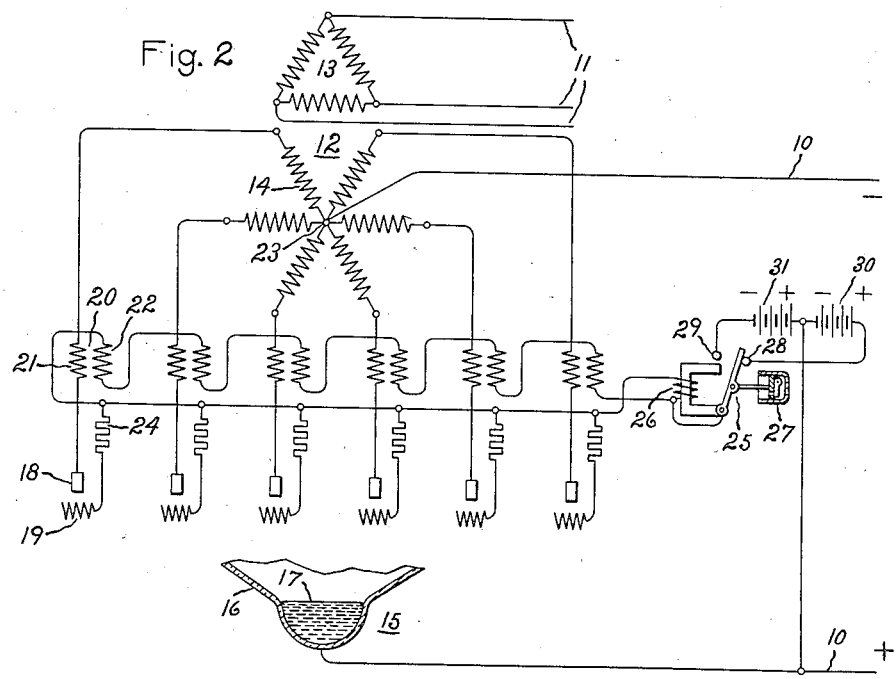

Referring to the drawing, Fig. 1 is a diagram illustrating a rectifier system embodying the invention, and Fig. 2 is a modification of the system illustrated in Fig. 1.

In the system shown in Fig. 1, power is transmitted between a direct current circuit 10 and an alternating current circuit 11 through a main transformer 12 having primary windings 13 and secondary windings 14, and a vapor electric device 15. This device in the present embodiment of the invention is a rectifier comprising an evacuated vessel 16, only the lower part of which is shown in the figure, a mercury cathode 17, anodes 18 and control electrodes 19 associated therewith. To provide means for impressing suitable potentials on the control electrodes or grids 19, a plurality of current transformers 20 are arranged in circuit with the anodes 18. The primary windings 21 of the current transformers are connected respectively between the anodes 18 and the neutral point 23 of the main transformer secondary 14 through the windings thereof. The secondary windings 22 of the current transformer 20 are connected in series, and this series of secondaries 22 is connected between cathode 17 and the control electrodes 19 through grid resistors 24.

The secondary windings 22 are so arranged that in normal operation of the rectifier 15 the voltages induced in these secondaries add to zero, while the direct current components of the current through the transformers 20 saturate the transformer cores. Upon occurrence of an arc back in the rectifier, however, the current reverses in one or more of the anode leads including primaries 21 of current transformers 20. The balance of the voltages in the series of secondaries 22 is thereby destroyed and a surge of current is produced therein which operates to impress on the control electrodes 19 a potential sufficiently negative, with respect to that of any of the anodes during those periods when in normal operation, they would commence to carry current, to prevent any anode not carrying current from commencing to carry current. It will be seen, therefore, that all the anodes will be thus cut off in succession as they stop carrying current.

The system shown in Fig. 2 is similar to that of Fig. 1 but includes a polarized relay 25 having a winding 26 in series with the secondaries 22 of current transformers 20, and time-limit means, such as a dash-pot 27. The relay comprises contacts 28, 29 which are connected respectively to current sources 30, 31. These sources are so arranged that when the relay operates to close contact 28 a potential positive with respect to the cathode 17 is impressed on the control electrodes 19 and when the relay closes contact 29 a potential negative with respect to the cathode is impressed on these control electrodes. The time-limit means is so arranged that the relay moves slowly to break the circuit at contact 29, being restrained by the dash-pot 27 when moving in this direction.

In the operation of the system shown in Fig. 2 it should be observed that in the event of arc-back the cathode spot on the mercury pool 17 is extinguished, so that when current is cut off from the anodes in succession as above explained in connection with the system of Fig. 1, all discharge in the rectifier ceases. The rectifier is then ready to be again placed in service to transfer power from circuit 11 to circuit 10 as soon as the starting apparatus usually provided can function. In case, however, it should be desired to delay the starting of the rectifier for a longer time, the polarized relay 25 is provided for this purpose. During starting and normal operation of the rectifier the relay is in the position shown in Fig. 2. In this position the contact 28 is preferably connected to cathode 17 not directly but through a current source 30. The negative terminal of source 30 is permanently connected to the cathode 17 and the positive terminal is connected through contact 28 to the control electrodes 19. Upon occurrence of arc-back the relay is operated by the surge of current produced in the secondaries 22, to open contact 28 and to close contact 29 without restraint from the dash-pot 27. The anodes are then cut off in succession and all discharge in the rectifier ceases, as hereinbefore explained. But in the system of Fig. 2, starting of the rectifier cannot be accomplished immediately thereafter since a potential negative with respect to the cathode is impressed on the control electrodes 19 by the current source 31, through the contact 29 of relay 15, which prevents flow of current from the anode 18. This negative potential is maintained for any predetermined period by the operation of the dash-pot 27, which is arranged to restrain the movement of the relay to open the contact 29.

What I claim as new and desire to secure by Letters Patent of the United States, is:

1. In a system for transferring power between direct and alternating current circuits, an arc discharge device including a cathode, a plurality of anodes and control electrodes therefor, a plurality of current transformers each having a secondary and each being connected in series with a different one of said anodes, said secondaries being connected in series, and means comprising said transformers and responsive to reverse current in said device to impress on said electrodes a potential sufficiently negative with respect to said anodes to prevent flow of anode current in said device.

2. In a system for transferring power between direct and alternating current circuits, an arc discharge device including a cathode, a plurality of anodes and control electrodes therefor, a plurality of current transformers each having a primary and a secondary, each of said primaries being connected in series with a different one of said anodes, said secondaries being connected in series, said transformers being so arranged that in normal operation of said system the voltages in said series of secondaries add to zero and that in response to reverse current in said device a surge of current occurs in said series of secondaries, and means comprising said secondaries to impress on said control electrodes a potential sufficiently negative with respect to said anodes to prevent anode current flow in said device.

3. In a system for transferring power between direct and alternating current circuits, an arc discharge device including a cathode, a plurality of anodes and control electrodes therefor, a plurality of current transformers each having a primary and a secondary, each of said primaries being connected in series with a different one of said anodes, said secondaries being connected in series, a time limit relay associated with said transformers, and means comprising said transformers and said relay and responsive to reverse current in said device to impress on said control electrodes a potential negative with respect to said cathode whereby current is cut off from said anodes in succession and to maintain said negative potential for a predetermined period after all discharge in said arc discharge device ceases.

4. In a system for transferring power between direct and alternating current circuits, an arc discharge device including a cathode, a plurality of anodes and control electrodes therefor, a plurality of current transformers each having a primary and a secondary, each of said primaries being connected in series with a different one of said anodes, said secondaries being connected in series, said transformers being so arranged that in normal operation of said system the voltages in said series of secondaries add to zero and that in response to reverse current in said device a surge of current occurs in said series of secondaries, a time limit relay operable by the current in said secondaries, and means comprising said secondaries and said relay to impress on said control electrodes a potential negative with respect to said cathode and to maintain said negative potential for a predetermined period after the occurrence of said reverse current.

DAVID C. PRINCE.